United States Patent [19]

Coggin et al.

[11] Patent Number: 4,839,938
[45] Date of Patent: Jun. 20, 1989

[54] FURNITURE HAVING WHEEL AXLES CONCEALED ON ONE SIDE

[75] Inventors: J. Thayer Coggin, High Point; Robert R. Hilton, Thomasville, both of N.C.

[73] Assignee: Thayer Coggin Incorporated, High Point, N.C.

[21] Appl. No.: 36,745

[22] Filed: Apr. 10, 1987

[51] Int. Cl.⁴ .................. A47B 91/00; B60B 33/00
[52] U.S. Cl. ............................................. 16/45
[58] Field of Search .............. 16/45, 29, 31 A, 31 R, 16/40, 97, 102; 297/5, DIG. 4

[56] References Cited

U.S. PATENT DOCUMENTS

| 8,154 | 4/1878 | Rivers . | |
|---|---|---|---|
| 313,097 | 3/1885 | Michelson . | |
| 314,959 | 3/1885 | Mendenhall . | |
| 314,967 | 3/1885 | Mendenhall . | |
| 454,284 | 6/1891 | McDonald | 16/19 |
| 672,138 | 4/1901 | Stockwell . | |
| 856,299 | 6/1907 | Ricker | 16/97 |
| 1,847,157 | 3/1932 | Wilhelm | 16/40 |
| 2,435,477 | 2/1948 | Swart | 16/97 |
| 3,858,271 | 1/1975 | Howard et al. . | |
| 3,884,495 | 5/1975 | Petock . | |

FOREIGN PATENT DOCUMENTS 1285146 of 0000 Fed. Rep. of Germany .

Primary Examiner—Fred A. Silverberg
Attorney, Agent, or Firm—Banner, Birch, McKie & Beckett

[57] ABSTRACT

Furniture is disclosed having concealed wheels which are supported and concealed by exposed and decoratively finished structural members of the furniture. Separate wheel shrouds or other add-on devices for concealing the wheels therefore are not needed. A method of constructing the concealed wheel support also is disclosed.

21 Claims, 1 Drawing Sheet

FURNITURE HAVING WHEEL AXLES CONCEALED ON ONE SIDE

BACKGROUND OF THE INVENTION

This invention relates to wheeled articles of furniture and, more particularly, to articles of furniture, such as chairs, having concealed wheels.

Wheeled chairs and other types of wheeled furniture are well known in the prior art. Casters typically are applied to chairs and other furniture to facilitate movement of the furniture in any direction. Often it is desirable to conceal casters of other types of wheels to improve the overall appearance of the furniture. Casters have been concealed by decorative shrouds or oversize furniture legs which necessarily are bulky in order to acccommodate full swinging movement of the casters. Examples of shrouded casters can be found in the patents to Michelson U.S. Pat. Nos. 303,097, Mendenhall 314,959, Stockwell 672,138 and Howard 3,858,271. In more contemporary furniture, where unidirectional rolling of an article of furniture, such as chair, is all that is required, a less bulky shrouding arrangement should suffice. However, in contemporary furniture having, for example, exposed metal frames with a decorative finish, such as a plated frame, no satisfactory wheel concealing arrangement is available which does not interrupt the clean lines and smooth finish of the frame.

SUMMARY OF THE INVENTION

It is, therefore, an object of the present invention to provide an arrangement in an article of furniture wherein the members that support the wheel assemblies have a decorative finish and also substantially conceal the wheel assemblies.

It is another object of the invention to provide such an article of furniture wherein the exterior surface contour and finish of the wheel supporting structure is substantially uninterrupted by the wheel assembly itself.

It is yet another object of the invention to provide such an article of furniture having a simple concealed wheel assembly which is easily assembled during manufacture and provides substantial strength and durability.

It is a further object of the invention to provide a method of constructing a concealed wheel support for an article of furniture having the above-described characteristics.

These and other objects of the invention are accomplished by providing an article of furniture having a furniture body and at least one wheel for rollably supporting at least a part of the body on the floor, and including wheel supporting and concealing structure comprising an inverted U-shaped channel member having parallel depending flanges interconnected by an upper bight portion, the channel member being secured to the lower part of the furniture body adjacent the floor and dimensioned to receive the wheel between the flanges and conceal the majority of the heigth of the wheel behind the flanges. A headed axle having a cylindrical shank and an enlarged head at one end rotatably supports the wheel between the flanges. The axle is received in an axle receiving aperture in one of the flanges within the shank projecting into the channel and the head abutting the outer surface of the one flange. Axle supporting means in the channel on the other flange, and aligned with the aperture, supports the distal end of the axle shank, with the other flange concealing the axle and the axle supporting means from external view. Axle retaining means is provided in the channel, concealed from external view, which engages the axle and retains it in position in the channel, whereby only the head of the axle and the minor portion of the wheel projecting below the flanges are exposed to view.

The article of furniture can be a chair, in which case two inverted U-shaped channel members are provided at opposite sides of the chair, each channel member supporting two such wheel assemblies, one at each corner of the chair.

The method relates to constructing a concealed wheel support for an article of furniture having a lower frame portion comprising an inverted U-shaped channel member with parallel depending flanges interconnected by an upper bight portion. The method comprises the steps of forming an axle receiving aperture in one of the flanges; fastening axle supporting means in the channel to the inner surface of the other flange, in alignment with the aperture; applying a decorative finish to the exterior of the frame, including the channel member; inserting a wheel into the channel member into alignment with the aperture and the axle supporting means; inserting a headed axle through the aperture, through the wheel and into engagement with the axle supporting means; and securing the axle into position to prevent withdrawal of the axle from the channel member.

BRIEF DESCRIPTION OF THE DRAWINGS

The novel features of the invention are set out with particularity in the appended claims, but the invention will be understood more fully and clearly from the following detailed description of a preferred embodiment of the invention as set forth in the accompanying drawings, in which:

DETAILED DESCRIPTION

Figure 1:
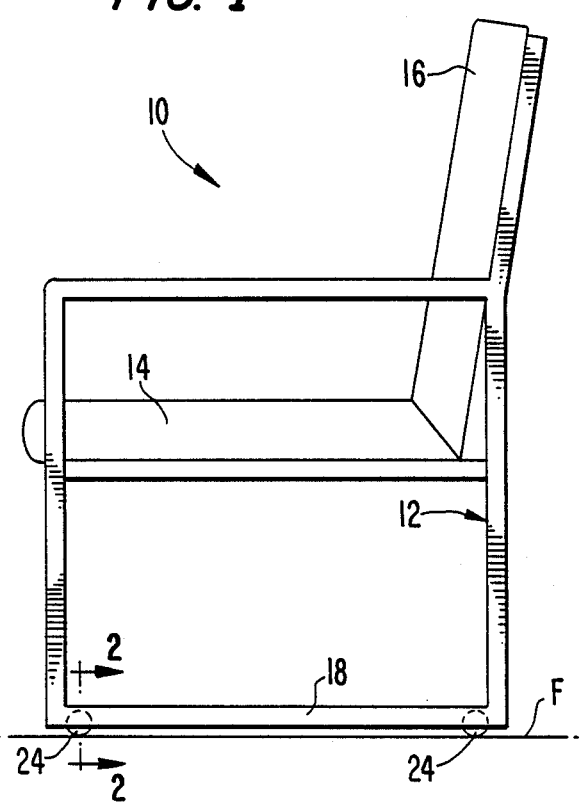
FIG. 1 is a side elevational view of a chair emboding the concealed wheel construction in accordance with the invention.

Referring to FIG. 1, a chair 10 constructed in accordance with the invention comprises a tubular steel frame 12 of generally square cross section which supports a C-cushion 14 and seat back 16. Frame 12 preferably has a decorative exterior finish, such as chrome plating or an epoxy coating. The frame on each side of the chair includes a lower channel member 18 of inverted U-shaped cross section (see FIG. 2) having a pair of parallel, depending flanges 20, 21 interconnected by an upper bight portion 22. Wheels 24 are journalled in members 18 adjacent the four corners of the chair, as described below, and rollably support the chair on floor F.

Figure 3:
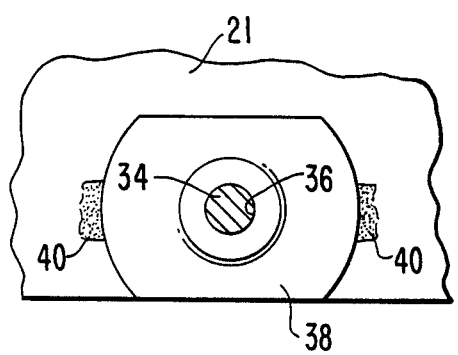
FIG. 3 is a sectional view taken along line 3-3 in FIG. 2.

Each wheel 24 is supported on an axle 26 which comprises a cylindrical shank 28 and an enlarged head 30. Head 30 has a decorative finish which preferably matches the finish of frame 12. Axle 26 is supported at its headed end in an aperture 32 formed in flange 20, and at its distal end 34 in a bore 36 formed in a metallic boss 38 which is brazed or welded at 40 to flange 21 (see FIG. 3).

Figure 2:
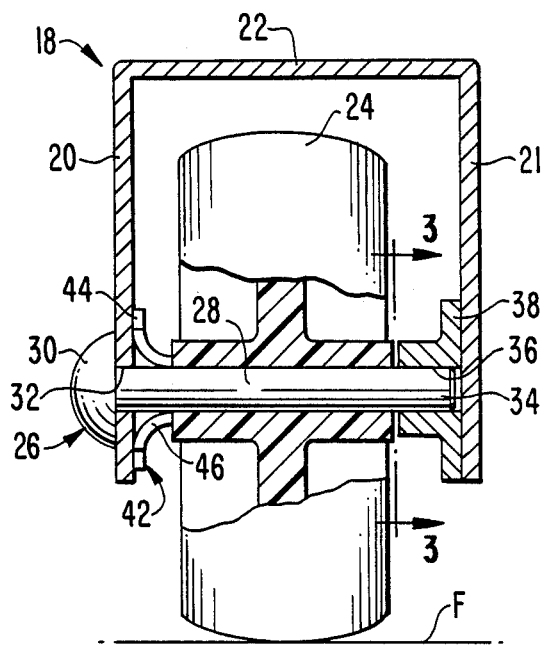
FIG. 2 is a sectional view taken along line 2-2 in FIG. 1.

Axle 26 is held in the position illustrated in FIG. 2 by means of a spring nut or push nut 42 of conventional design having a flange portion 44 which abuts the inner surface of flange 20 and spring tabs 46 which frictionally engage shank 28.

The parts illustrated in FIG. 2 are assembled as follows. Wheel 24 first is inserted into channel member 18 with its hub in alignment with aperture 32 and bore 36 of boss 38. Next, spring nut 42 is inserted between wheel 24 and flange 20 and held in position while the distal end 34 of axle 26 is inserted through aperture 32 in flange 20, through spring nut 42 and through wheel 24 into engagement with boss 38. Because of the frictional engagement of spring nut 42 with shank 28, a certain degree of force is required to drive axle 26 home. This can be done with a mallet, a press or any other suitable tool. Once in its final position, axle 26 cannot be withdrawn because of the action of spring nut 42.

Instead of spring nut 42, other retaining elements can be used adjacent flange 20 in order to keep axle 26 from withdrawing from channel member 18. For example, shank 28 can be grooved adjacent head 30, just inside flange 20, for receipt of a conventional C-shaped spring clip which would snap over shank 28 into the groove. Alternatively, a small diametric bore can be formed in shank 28 at the same location and a roll pin force-fitted into the hole, the roll pin flanked by washers which engage flange 20 and wheel 24 to retain axle 26 in position.

Figure 4:
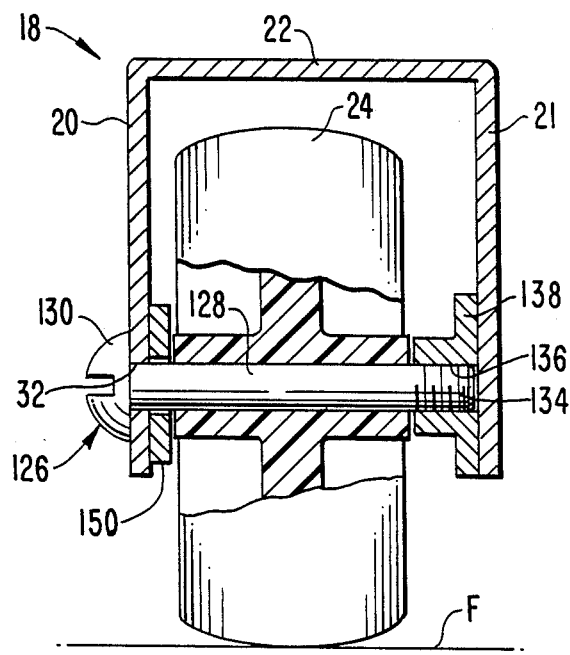
FIG. 4 is a sectional view similar to FIG. 2 showing an alternative embodiment.

FIG. 4 illustrates and alternative construction for supporting and retaining the axle and wheel in position. In this embodiment, the same reference numerals are used to denote identical parts. Axle 126 has a threaded distal end 134, a smooth shank 128 and a decoratively finished slotted head 130. The axle supporting means in this embodiment is a threaded boss 138 having a threaded bore 136 which mates with the threaded distal end 134 of axle 126. Threaded boss 138 similarly is brazed or welded into position on flange 21. A spacer or washer 150 is located between wheel 24 and flange 20.

In assembling the components of the embodiment of FIG. 4, the wheel 24 and washer 150 are held in position in alignment with aperture 32 and threaded bore 136. Threaded axle 126 is then passed through aperture 32, washer 150 and wheel 24, and then is tightly screwed into boss 138. The threads of bore 136 preferably are of the locking type which resist rotational movement of distal end 134 to prevent loosening of axle 126. Threaded boss 138 thus may be a flanged lock nut. Any type of head may be provided on axle 126 as long as an appropriate turning tool can be applied to tighten the axle.

The above-described concealed wheel furniture construction affords simple and straightforward fabrication steps. Thus, referring to FIG. 2, boss 38 first is brazed or welded to flange 21 of the unfinished frame. The frame then is cleaned and an appropriate decorative coating is applied to the exterior surfaces of the frame, including the outer surface of flange 21. The resulting surface finish is smooth, clean and uninterrupted by any of the supporting structure that is conceals. Thereafter, wheel 24, axle 26 and spring nut 42 are assembled as described above.

From the foregoing it will be seen that the invention readily accomplishes the stated objectives. A majority of the height of wheel 24 is concealed behind and between flanges 20 and 21, along with substantially all of the structure that supports the wheel. Only the head 30 (130) of the axle is exposed, and this preferably faces the center of the chair so as not to be readily visible. The outer flanges 21 have a completely smooth surface finish, uninterrupted by any of the supporting structure concealed behind it. The exposed decorative frame of the chair itself thus is the very structure which supports and conceals the wheel assemblies without compromising the aesthetic appearance of the chair.

The disclosure is illustrative only and it is to be understood that the invention is not limited to the precise illustrated embodiments. Numerous modifications and variations of the above-described embodiments will be apparent to those of ordinary skill without departing from the spirit and scope of the invention, which is defined by the appended claims.

We claim:

1. In an article of furniture having a furniture body and at least one wheel for rollably supporting at least part of the body on the floor, wheel supporting and concealing structure comprising:

an inverted U-shaped channel member having parallel depending flanges interconnected by an upper bight portion, said channel member being secured to the lower part of the furniture body adjacent the floor and dimensioned to receive the wheel between said flanges and conceal the majority of the height of the wheel behind said flanges;

a headed axle having a cylindrical shank and an enlarged head at one end thereof, for rotatably supporting the wheel between said flanges;

an axle-receiving aperture in only one of said flanges for supporting the headed end of said axle with said shank projecting into and substantially across said channel and said head abutting the outer surface of said one flange;

axle supporting means in said channel on the other of said flanges and aligned with said aperture for supporting the distal end of said axle shank, said other flange being imperforate in the region of said axle supporting means to conceal said axle and said axle supporting means from external view; and axle retaining means in said channel, concealed from external view, for engaging said axle and retaining it in position in said channel, whereby only said head of said axle and the minor portion of the wheel projecting below said flanges are exposed to view.

2. Furniture according to claim 1 wherein said axle retaining means is disposed on said axle adjacent said aperture, gripping said shank and abutting said one flange to prevent axial movement of said axle out of said aperture.

3. Furniture according to claim 2 wherein said axle retaining means comprises a flanged, resilient, shank-engaging element.

4. Furniture according to claim 3 wherein said axle retaining means comprises a spring nut.

5. Furniture according to claim 2, 3 or 4 wherein said axle supporting means comprises a boss secured to said other flange and having a shank-receiving bore aligned with said aperture.

6. Furniture according to claim 1 wherein said axle retaining means and said axle supporting means together comprise a threaded boss secured to said other flange and mating threads on the distal end of said shank, said axle head having means for turning said axle to engage the mating threads in said boss and on said shank.

7. Furniture according to claim 6 wherein said threaded boss is a locknut.

8. A wheeled article of furniture comprising:
a furniture body including a frame having two inverted, U-shaped channel members adjacent and extending along the bottom of opposite sides of the body, each of said channel members having parallel depending flanges interconnected by an upper bight portion; and
at least one wheel assembly in each channel member for rollably supporting at least part of the body on the floor with the majority of the wheel assembly concealed by said flanges, each said wheel assembly comprising:
a wheel;
a headed axle having a cylindrical shank and an enlarged head at one end thereof, for rotatably supporting the wheel between said flanges;
an axle-receiving aperture in only one of said flanges for supporting the headed end of said axle with said shank projecting into and substantially across said channel and said head abutting the outer surface of said one flange;
axle supporting means in said channel on the other of said flanges and aligned with said aperture for supporting the distal end of said axle shank, said other flange being imperforate in the region of said axle supporting means to conceal said axle and said axle supporting means from external view; and
axle retaining means in said channel, concealed from external view, for engaging said axle and retaining it in position in said channel, whereby only said head of said axle and the minor portion of the wheel projecting below said flanges are exposed to view.

9. Furniture according to claim 8 wherein said axle retaining means is disposed on said axle adjacent said aperture, gripping said shank and abutting said one flange to prevent axial movement of said axle out of said aperture.

10. Furniture according to claim 9 wherein said axle retaining means comprises a flanged, resilient, shank-engaging element.

11. Furniture according to claim 10 wherein said axle retaining means comprises a spring nut.

12. Furniture according to claim 9, 10 or 11 wherein said axle supporting means comprises a boss secured to said other flange and having a shank-receiving bore aligned with said aperture.

13. Furniture according to claim 8 wherein said axle retaining means and said axle supporting means together comprise a threaded boss secured to said other flange and mating threads on the distal end of said shank, said axle head having means for turning said axle to engage the mating threads in said boss and on said shank.

14. Furniture according to claim 13 wherein said threaded boss is a locknut.

15. A chair comprising:
a chair body including a frame having two inverted, U-shaped channel members adjacent the bottom of and extending along opposite sides of the body, each of said channel members having parallel depending flanges interconnected by an upper bight portion; and
two wheel assemblies in each channel member, one wheel assembly adjacent each corner of the chair, for rollably supporting the chair for fore and aft movement on the floor with the majority of each wheel assembly concealed by said flanges, each wheel assembly comprising:
a headed axle having a cylindrical shank and an enlarged head at one end thereof, for rotatably supporting the wheel between said flanges;
an axle-receiving aperture in only one of said flanges for supporting headed end of said axle with said shank projecting into and substantially across said channel and said head abutting the outer surface of said one flange;
axle supporting means in said channel on the other of said flanges and aligned with said aperture for supporting the distal end of said axle shank, said other flange being imperforate in the region of said axle supporting means to conceal said axle and said axle supporting means from external view; and
axle retaining means in said channel, concealed from external view, for engaging said axle and retaining it in position in said channel, whereby only said head of said axle and the minor portion of the wheel projecting below said flanges are exposed to view.

16. A chair according to claim 15 wherein said axle retaining means is disposed on said axle adjacent said aperture, gripping said shank and abutting said one flange to prevent axial movement of said axle out of said aperture.

17. A chair according to claim 16 wherein said axle retaining means comprises a flanged, resilient, shank-engaging element.

18. A chair according to claim 17 wherein said axle retaining means comprises a spring nut.

19. A chair according to claim 16, 17, or 18 wherein said axle supporting means comprises a boss secured to said other flange and having a shank-receiving bore aligned with said aperture.

20. A chair according to claim 15 wherein said axle retaining means and said axle supporting means together comprise a threaded boss secured to said other flange and mating threads on the distal end of said shank, said axle head having means for turning said axle to engage the mating threads in said boss and on said shank.

21. A chair according to claim 20 wherein said threaded boss is a locknut.

* * * * *